July 27, 1965 J. V. LITTLEFIELD 3,196,566

DISPLAY APPARATUS

Filed June 21, 1963

INVENTOR.
JOHN V. LITTLEFIELD

BY Albert M. Herzig

ATTORNEY 3,196,566
DISPLAY APPARATUS
John V. Littlefield, 1016 Palm Ave., Los Angeles, Calif.
Filed June 21, 1963, Ser. No. 289,590
1 Claim. (Cl. 40—106.3)

The present invention relates generally to display apparatus and more particularly to such apparatus wherein an object is supported by magnetic force to create the illusion of a floating or flying object.

Various means and apparatus have been used in the past to display objects or models. The most common type is a solid connection of some type between the model and a base. This is particularly true for relatively small desk or shelf size devices or models.

For displaying certain types of objects which represent in miniature such things as aircraft or missiles, it is desirable to create the illusion of free floating or free flight. To achieve this illusion, it is desirable that the object appears to be unsupported, and the presence of a solid connection tends to defeat this illusion of free floating or flight.

To create the illusion of floating or free flight for various objects such as representations of aircraft and the like, some prior devices have utilized direct magnetic attraction. In such prior arrangements there has been a physical connection at one end of the object and a magnet is disposed at the other end of the object. In view of the effect of distance upon magnetic attraction and considering further the fact that normally only relatively small and less powerful magnets may feasibly be used in small display apparatus, the magnetic attracting means will necessarily be disposed quite near to the attracted object. This tends to create the illusion that the object is surounded and enclosed rather than free and unsupported and therefore does not meet the need described above for an apparatus for creating the illusion of a free flight.

Accordingly, it is a primary object of the present invention to provide novel and improved display apparatus.

It is a further object to utilize the balance between magnetic repulsion and the force of gravity to create a display apparatus providing the illusion of free or unfettered flight.

It is a still further object to provide means for floating a variety of different objects. Another object is to provide positioning means for floating an object in several different spacial positions.

It is a further more specific object to provide means for mounting magnetic members in a base element to provide magnetic force without interfering with the continuity of the upper surface of the base element.

It is a further object to provide a novel and improved arrangement of magnetic members to provide a highly reliable and stable condition of support. Still another object is the provision of a lofted object which may be made to move, while aloft, to enhance the illusion of free flight.

Other objects and advantages of the present invention will become obvious from the following description and the drawings, wherein.

Figure 1:
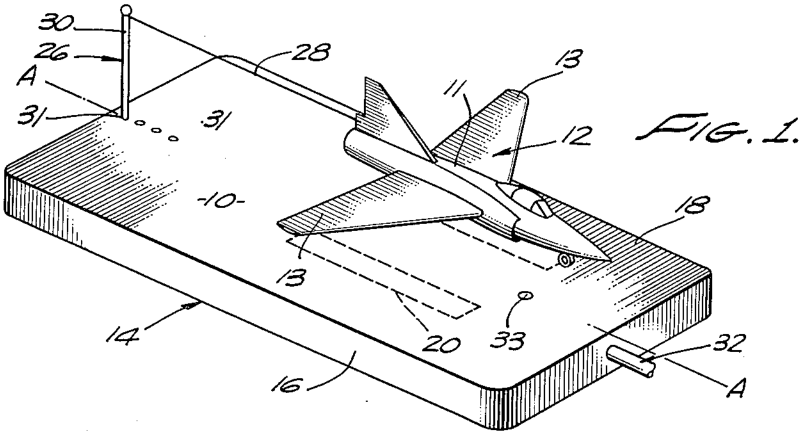
FIGURE 1 is a perspective view of a model airplane display device embodying display apparatus illustrative of various features of the present invention and showing the model airplane in its supported flying position.

Briefly, the illustrated display device 10, which embodies apparatus illustrative of the present invention, includes an object in the form of a model airplane 12, and a base element 14 which includes magnetic means 20 that interacts with magnetic means 24 secured to the model airplane. The device 10 further includes positioning means that are adapted to cooperate with the forces acting on the model airplane 12 to maintain it in its flight or floating position.

The display apparatus illustrating the invention will be described primarily in terms of a model airplane display device for ease of description and inasmuch as this is a particularly suitable application for the display apparatus. It will be understood, however, that the display apparatus is of broader application and that the supported or positioned object may take any of a variety of other forms. Merely by way of example and without limitation, the object might take the form of a representation of other space craft such as a rocket or a satellite, it might take the form of a representation of a vessel such as a submarine which in a sense floats within a liquid medium, or an automobile, or it might take the form of a representation of a bird figure or other imaginative or figurative character; e.g., a witch on a broomstick for a Halloween display, a turbaned Arab on a flying carpet, or the like, or any product to which a floating or flying effect would want to be given.

Now to consider the illustrated display device 10 in further detail.

As seen in the drawings, the illustrated object or object element is in the form of a minature replica or model 12 of a jet airplane having an elongated body 11, wings 13, and a tail structure, that are made from a nonmagnetic material such as various plastics or wood. It is preferred that a rather low density and therefore lightweight material be used. In the underside of the body 11 is formed an elongated longitudinally extending cavity or recess 21 in which is secured an elongated bar or rod magnet 24 which provides the magnetic object member or means for the illustrated display device 10.

While the magnetic means of the illustrated device are provided by bar or rod magnets, other forms of magnetic means, as for example electromagnets, may be used.

The illustrated base element 14 is comprised in the illustrated structure of a rectangular plate 16 of nonmagnetic material such as plastic or wood. The base element 14 also includes a pair of spaced apart elongated, rectangular bar magnets 20 which are mounted in the plate 16 and provide the magnetic base members or means for the illustrated display device 10. In particular, the illustrated plate 16 is provided with a generally smooth, level, and continuous upper surface 18, and with a pair of elongated generally rectangular recesses 19 in its undersurface for receiving the elongated rectangular bar magnets 20. As seen best in FIGURE 1, in the illustrated device 10 the recesses extend generally longitudinally of the plate 16 and are generally spaced apart and equally distant from the longitudinal center line A—A of the plate 16. As seen best in FIGURES 2 and 3, the recesses 19 are in the underside of the plate 16 and extend upwardly into the plate to within close proximity of the level upper surface 18. The bar magnets 20 are secured in place within the recesses 19 as deeply as possible so that they will be close to the upper surface 18 of the plate 16 and perform effectively.

Thus, in the illustrated device 10, the base element 14 has the smooth continuous upper surface 18 which is comprised, in part, of the thin layers of integral material of the nonmagnetic plate 16 in the areas directly above the recesses 19. These thin sections of material are designated 17 in the drawings.

If desired, and as an alternative construction, the base element may be comprised of a nonmagnetic plate with the cavities or recesses extending completely therethrough. To complete the base element, a complete surface or top layer may be secured to the upper surface of that recessed nonmagnetic plate, to provide the smooth and continuous upper surface including the thin layer areas over the magnets.

In the illustrated device 10 the undersurface of the base element 14 is provided with a soft or nonmarring finish by a thin layer 15 of felt or like material which is secured to the underside of the nonmagnetic plate 16 and thus closes over the recesses or cavities 19.

The bar or rod magnets 24 and 20 are generally aligned with like poles adjoining or aligned so as to create the desired magnetic repulsion. That is, the south pole, designed S, of bar magnet 24 is disposed generally above the south pole of bar magnets 20, while the north pole, designated N, of magnet 24 is disposed generally above the north poles of magnets 20. The magnetic repulsion between like poles serves to hold or support the illustrated model airplane 12 in a lofted or airborne position spaced above the base element 14.

Figures 3, 4:
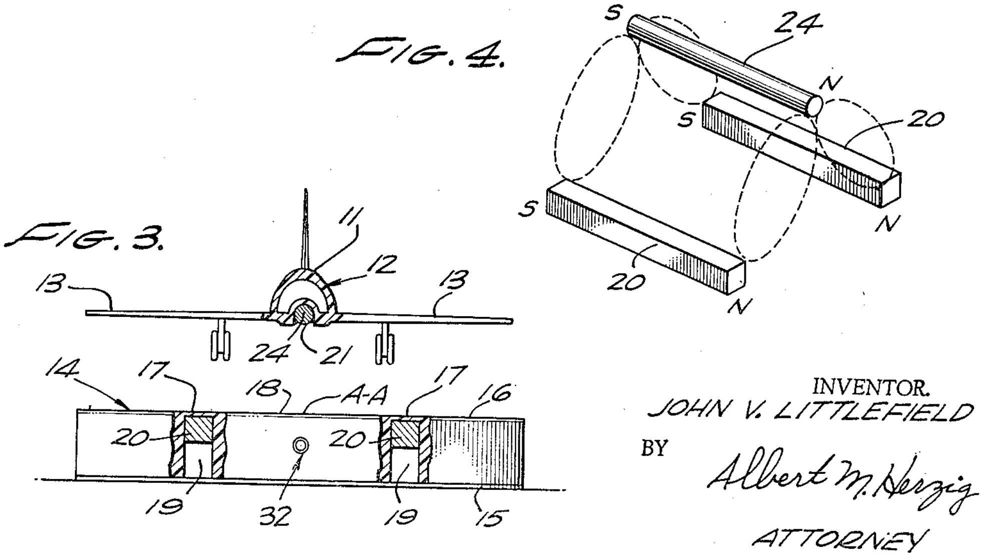
FIGURE 3 is a sectional view taken generally along line 3—3 of FIGURE 2.
FIGURE 4 is a perspective view illustrating the relative position of the magnetic members when the model airplane is in its supported flying position.

The particular construction and arrangement of the magnetic members or means are of course of particular significance to the effective operation of the device. The general arrangement of these members or means in the illustrated device 10, when the airplane 12 is supported on in its flight position, is shown in the drawings. It has been found that the use of a pair of spaced apart magnetic members on one of the elements (the object element or the base element), when coupled with the use of a single magnetic member on the other of the elements, creates a natural stabilizing or balancing effect which is quite important to the practicality and saleability of a display device such as that shown. As shown in FIGURE 3, the action of the three magnetic members 20 and 24 of the illustrated device tends to align the bar magnet 24 of the model airplane generally within a vertical plane which bisects the distance between the bar magnets 20. This results from the use of generally identical bar magnets 20 and from the positioning of the various parts. As seen in FIGURE 3, the symmetry of the illustrated device results in the bar magnet 24 (and thus the model airplane 12) being centered over the base element 14, with the bar magnet 24 extending generally above the longitudinal center line A—A of the base element.

The positioning means of the illustrated device 10 comprises the holding means 26. The illustrated holding means 26 includes a pin 30 that is removably and adjustably mounted on the base element 14 and a cord 28 connected between the upper end of the pin 30 and the rear end of the model airplane 12. As seen best in FIGURES 1 and 2, the lower end of the pin 30 is removably received in an aperture 31 in the base element 14 at a position spaced from the bar magnets 20. Several additional apertures 31, all of which are disposed along the longitudinal center line A—A of the plate 16, are provided in the illustrated device for adjusting the location of a supported object or to accommodate different objects.

The cord of line 28 is preferably quite thin and of a dark color to make it as inconspicuous as possible.

Figure 2:
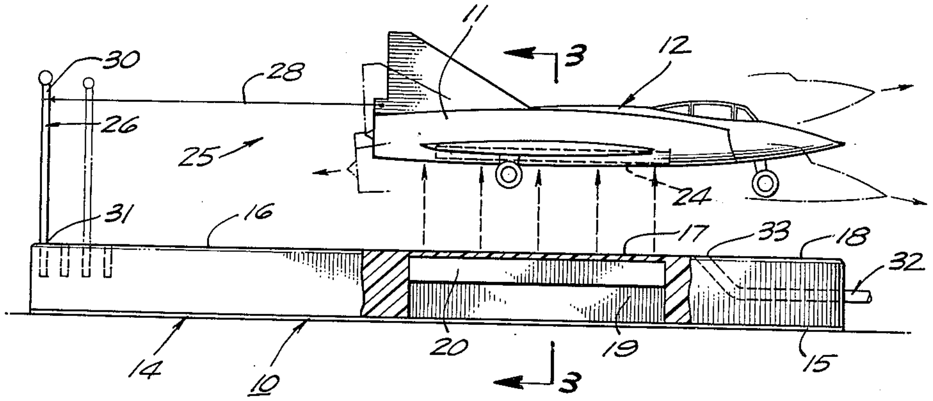
FIGURE 2 is a side view, with parts broken away to reveal details of construction, of the illustrated model airplane display device of FIGURE 1.

To position the illustrated model airplane 12 at the end of the cord 28 and to maintain it in that position, the illustrated cord 28 is made sufficiently long to allow the model airplane 12 to be located, as viewed in FIGURE 2, with the magnet 24 slightly forward of the magnets 20. This causes the model airplane 12 to be urged in a forwardly direction and maintained at the end of the tensioned cord 28.

The model airplane will tend to maintain position supported generally above the center line A—A and at the end of the extended cord 28. It may be noted that this effect is achieved without having a magnet or magnets directly opposite the point of attachment of the object 12 to thereby interfere with or dispel the illusion of free flight of the object.

The arrangement and construction of illustrated device 10 imparts a considerable degree of stability to the floating object. The arrangement of the magnets 20 and 24 tends to center the object between the pair of magnets 20 while urging the object longitudinally so as to tension its connection cord 28. The model airplane 12 may be moved slightly, either accidentally or intentionally, and it will tend to return to its equilibrium position. Gentle vibratory effects may accompany this movement and return to equilibrium, thereby to enhance the illusion of flight.

Actuating or movement inducing means may be utilized in connection with the aforesaid stability and vibrating characteristics of the floating object 12. As shown in FIGURES 1 and 2, a tube or pipe 32 is mounted in the base element 14 with outlet aperture or opening 33 disposed below the floating model airplane 12. Various means (not shown) may be used to induce a stream of air through the passageway 32 to cause slight movement, including vibration or rocking movement of the model airplane. Further, an external source of wind or air movement such as a small fan or the human breath may be used to cause such slight movement of the model airplane to enhance the illusion of free flight.

The model airplane 12 is illustrated in a generally level flight position in the drawings (FIG. 2). If desired, and within limits, the orientation or position of the model airplane 12 may be varied or changed, as shown for example by the representative tilted positions illustrated by partial representations of the model airplane in broken line in FIGURE 2. This may be done, for example, by changing the position or the orientation of the pin 30 or the cord 28. A particular spacial orientation, such as a nose-upward tilt of the model airplane, may also be achieved by weighting the object in a particular way or by varying the magnetic forces involved. Further, it would be possible to create the illusion of flight upward or takeoff by sloping all or part of the upper surface of the base element while allowing the magnetic members or means to remain level. Still further it could be possible to vary the location, construction, or disposition of the magnetic members or means themselves for particular constructions and to achieve particular effects.

Thus, a highly practical, simple, economical and durable structure for displaying objects is provided by the illustrated device. No physical connection will ordinarily be seen, and the object gives the illusion of being in flight or floating freely. Further, the illustrated device possesses a considerable degree of stability and the ability to self-adjustment or maintain or resume its position after being disturbed.

Various modifications and changes, in addition to those offered by way of example in the foregoing description, may be made in the illustrated device or structure without departing from the spirit and scope of the present invention. Various features of the present invention are set forth in the following claim.

What is claimed is:

A display apparatus for maintaining an object in an apparently unsupported position above a base, said apparatus comprising: a base including a non-magnetic part; an object also including a non-magnetic part, said object being adapted to be maintained in position spaced above said base in a manner creating the illusion of free flight; a pair of elongated magnetic members secured to the non-magnetic parts of said base, said magnetic members being disposed in generally parallel spaced apart relation to one another, said magnetic members being disposed with like poles adjacent to one another; a third elongated magnetic member secured to the non-magnetic part of said object, said object being positioned so that poles of its magnet are generally above those poles of said pair of magnets which are of the same polarity; a cord secured between said object and said base to extend generally parallel to said magnets to restrain said object against movement parallel to said magnets, said cord being of such length that the magnetic member of said object is slightly displaced longitudinally thereof, relative to the magnetic members of said base and in such direction that said object is magnetically biased in a direction to tension said cord.

References Cited by the Examiner

UNITED STATES PATENTS

| | | | |
|---|---|---|---|
| 647,327 | 4/00 | Rehlin | 46—242 X |
| 2,000,332 | 5/35 | Jensen | 46—236 |
| 2,693,788 | 11/54 | Spatz | 120—108 |
| 2,702,191 | 2/55 | Lemelson | 40—106.45 X |
| 3,012,369 | 12/61 | West | 40—106.45 X |

FOREIGN PATENTS

| | | |
|---|---|---|
| 1,260,362 | 3/61 | France. |
| 574,516 | 3/58 | Italy. |

EUGENE R. CAPOZIO, *Primary Examiner.*

JEROME SCHNOLL, *Examiner.*